(12) United States Patent
Hosokai et al.

(10) Patent No.: US 11,409,331 B2
(45) Date of Patent: Aug. 9, 2022

(54) PORTABLE INFORMATION DEVICE AND COVER DEVICE

(71) Applicant: LENOVO (SINGAPORE) PTE. LTD., Singapore (SG)

(72) Inventors: Tatsuya Hosokai, Yokohama (JP);
Tatsuya Ushioda, Yokohama (JP);
Hiroaki Kinoshita, Yokohama (JP);
Hiroki Ueno, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/371,202

(22) Filed: Jul. 9, 2021

(65) Prior Publication Data

US 2022/0026958 A1 Jan. 27, 2022

(30) Foreign Application Priority Data

Jul. 21, 2020 (JP) .............................. JP2020-124306

(51) Int. Cl.
*G06F 1/16* (2006.01)

(52) U.S. Cl.
CPC .......... *G06F 1/1656* (2013.01); *G06F 1/1616* (2013.01); *G06F 1/1681* (2013.01); *G06F 1/1686* (2013.01)

(58) Field of Classification Search
CPC .... G06F 1/1607; G06F 1/1616; G06F 1/1633; G06F 1/161; G06F 1/166
See application file for complete search history.

(56) References Cited

U.S. PATENT DOCUMENTS

| | | | | |
|---|---|---|---|---|
| RE48,041 E | * | 6/2020 | Wu | ........................ F16M 11/10 |
| 11,275,410 B1 | * | 3/2022 | Hosokai | ................ G06F 1/1647 |
| 2014/0362513 A1 | | 12/2014 | Nurmi | |
| 2017/0010629 A1 | * | 1/2017 | Tsuchihashi | ........... G06F 1/166 |
| 2019/0361495 A1 | * | 11/2019 | Buechin | ............... H05K 7/1417 |
| 2020/0249726 A1 | * | 8/2020 | Brocklesby | .......... H02G 11/003 |
| 2022/0083098 A1 | * | 3/2022 | Hosokai | ................ G06F 1/1616 |

FOREIGN PATENT DOCUMENTS

| | | |
|---|---|---|
| JP | S56159577 | 11/1981 |
| JP | 11148265 | 6/1999 |
| JP | 2009088668 A | 4/2009 |
| JP | 3178092 | 8/2012 |
| JP | 2018097420 A | 6/2018 |
| JP | 2018105961 A | 7/2018 |
| JP | 2018136908 A | 8/2018 |
| JP | 2020509510 A | 3/2020 |

* cited by examiner

*Primary Examiner* — Anthony Q Edwards
(74) *Attorney, Agent, or Firm* — Shimokaji IP

(57) ABSTRACT

A portable information device includes a chassis, and a cover device that covers the back surface of the chassis. The cover device has a base cover section, a stand cover section rotatable relative to the base cover section and movable between a stored position of being provided along the back surface of the chassis and a standing position of protruding from the back surface of the chassis, and a hinge device. A first bracket has a first notch-shaped portion in a root part of the side end face thereof on the side of a hinge shaft to face the side of the second bracket in the axial direction. A second bracket has a second notch-shaped portion in a root part of the side end face thereof on the side of the hinge shaft to face the side of the first bracket in the axial direction.

8 Claims, 11 Drawing Sheets

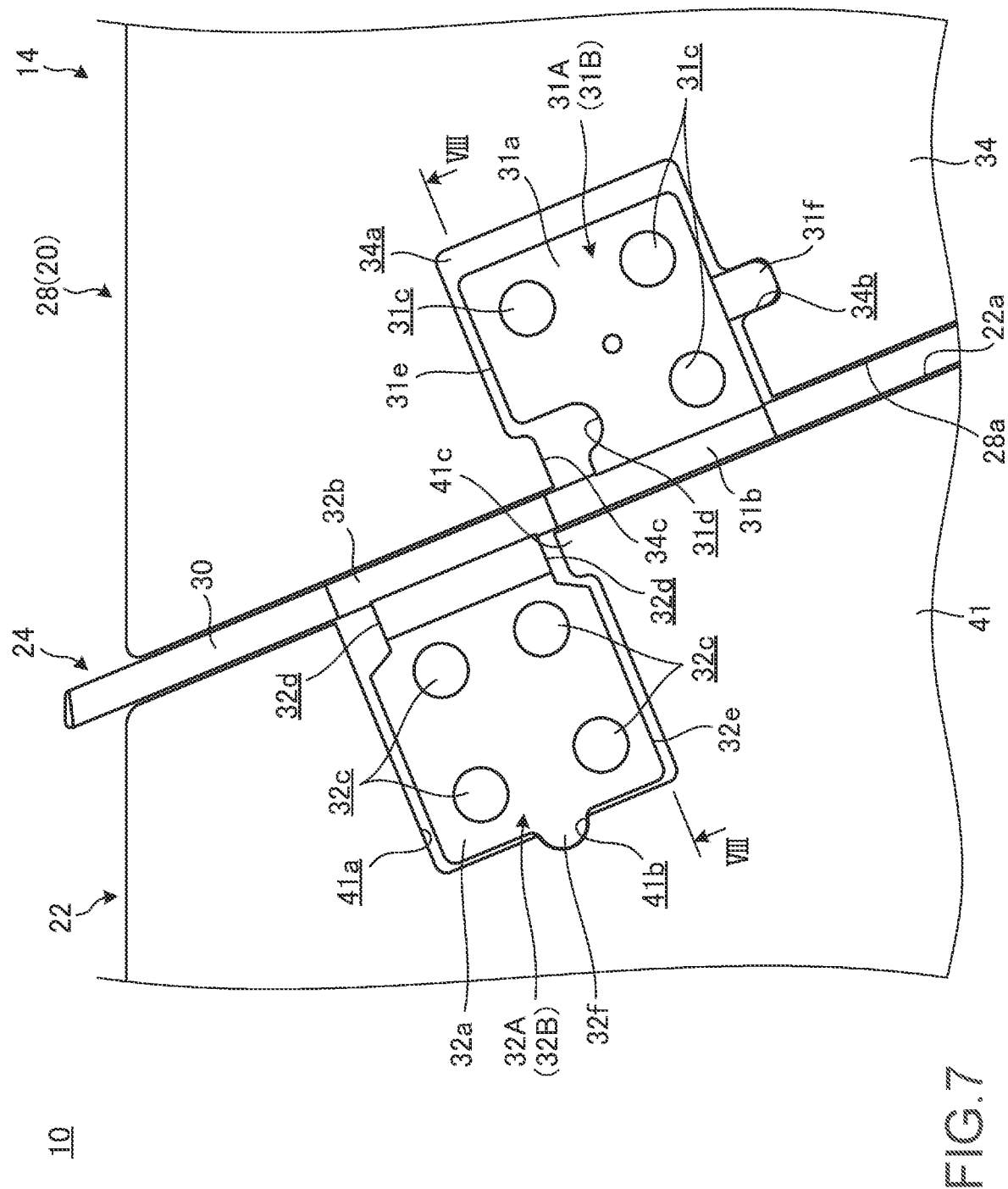

PORTABLE INFORMATION DEVICE AND COVER DEVICE

FIELD OF THE INVENTION

The present invention relates to a portable information device having a cover device and the cover device.

BACKGROUND OF THE INVENTION

A portable information device such as a laptop PC or a tablet PC is required to avoid damage or breakdown when being carried around. Further, it is desired that the appearance design and the sense of touch of the portable information device should be of high quality. Therefore, a cover device may be mounted on the outer surface of the chassis of the portable information device for the purpose of protection or decoration. The applicant proposes a cover device for a foldable tablet PC in Japanese Unexamined Patent Application Publication No. 2018-105961.

SUMMARY OF THE INVENTION

As described in Japanese Unexamined Patent Application Publication No. 2018-105961, the cover device is required not only to simply cover the outer surface of the chassis, but also to be rotated as necessary so as to function as a stand for the device. The cover device of this type has a base cover section relatively fixed to the outer surface of the chassis, and a stand cover section to be rotated relative to this base cover section by using a hinge device.

In the meantime, in the cover device, a soft material such as natural leather, artificial leather, or the like may be used as the outermost surface material in consideration of the appearance design and the sense of touch of the cover device. In the cover device using this type of material, when the stand cover section is rotated relative to the base cover section at more than a certain angle, for example, up to an angle close to 180 degrees, side end faces of right and left brackets of the hinge device function as scissors blades. As a result, it is found that the surface materials of the base cover section and the stand cover section can be broken down or damaged due to the cutting power of the scissors blades.

The present invention has been made in view of the above conventional technique problem, and it is an object thereof to provide a portable information device having a cover device capable of suppressing the occurrence of breakage and damage, and the cover device.

A portable information device according to the first aspect of the present invention includes: a chassis; and a cover device provided to cover the back surface of the chassis, the cover device including: a base cover section provided along the back surface of the chassis; a stand cover section provided to be rotatable relative to the base cover section so as to be movable between a stored position where the stand cover section is provided along the back surface of the chassis and a standing position where the stand cover section protrudes from the back surface of the chassis; and a hinge device having a hinge shaft, a first bracket rotatably coupled to the hinge shaft and fixed relative to the back surface of the chassis, and a second bracket provided adjacent to the first bracket in an axial direction of the hinge shaft, coupled rotatably to the hinge shaft, and fixed to the stand cover section, wherein the first bracket has a first notch-shaped portion in a root part of a side end face thereof on the side of the hinge shaft to face the side of the second bracket in the axial direction, and the second bracket has a second notch-shaped portion in a root part of a side end face thereof on the side of the hinge shaft to face the side of the first bracket in the axial direction.

The portable information device may also be such that the base cover section has a first core material, and a first surface material formed of a material softer than the first core material to form the surface of the base cover section, the stand cover section has a second core material, and a second surface material formed of a material softer than the second core material to form the surface of the stand cover section, the first core material has a first bracket placement hole in which the first bracket is placed, and a first protruding portion protruding from an inner peripheral surface of the first bracket placement hole into the first notch-shaped portion, and the second core material has a second bracket placement hole in which the second bracket is placed, and a second protruding portion protruding from an inner peripheral surface of the second bracket placement hole into the second notch-shaped portion.

The hinge device may also be so structured that at least the shaft center of the hinge shaft is located in a position lower than the surfaces of the base cover section and the stand cover section.

The portable information device may further be such that the chassis includes: a first chassis; and a second chassis coupled adjacent to the first chassis to be rotatable relative to the first chassis, the base cover section includes: a slide cover section provided to be movable relative to the back surface of the first chassis along a line-up direction of the first chassis and the second chassis; a fixed cover section relatively fixed to the back surface of the second chassis; and a folding cover section which connects between the slide cover section and the fixed cover section to be movable relative to each other, and the stand cover section is placed to be movable relative to the back surface of the second chassis and adjacent to the fixed cover section across the hinge device.

The portable information device may further include: a display provided on at least the surface of the first chassis; and a camera provided in a peripheral portion of the display on the surface of the first chassis.

A cover device according to the second aspect of the present invention is a cover device configured to cover the back surface of a chassis of a portable information device, including: a base cover section; a stand cover section provided to be rotatable relative to the base cover section; and a hinge device having a hinge shaft, a first bracket rotatably coupled to the hinge shaft and fixed relative to the base cover section, and a second bracket provided adjacent to the first bracket in an axial direction of the hinge shaft, coupled rotatably to the hinge shaft, and fixed to the stand cover section, wherein the first bracket has a first notch-shaped portion in a root part of a side end face thereof on the side of the hinge shaft to face the side of the second bracket in the axial direction, and the second bracket has a second notch-shaped portion in a root part of a side end face thereof on the side of the hinge shaft to face the side of the first bracket in the axial direction.

The cover device may also be such that the base cover section has a first core material, and a first surface material formed of a material softer than the first core material to form the surface of the base cover section, the stand cover section has a second core material, and a second surface material formed of a material softer than the second core material to form the surface of the stand cover section, the first core material has a first bracket placement hole in which the first bracket is placed, and a first protruding portion protruding from an inner peripheral surface of the first bracket placement hole into the first notch-shaped portion, and the second core material has a second bracket placement hole in which the second bracket is placed, and a second protruding portion protruding from an inner peripheral surface of the second bracket placement hole into the second notch-shaped portion.

The hinge device may also be so structured that at least the shaft center of the hinge shaft is located in a position lower than the surfaces of the base cover section and the stand cover section.

The above-described aspects of the present invention can suppress the occurrence of breakage and damage.

BRIEF DESCRIPTION OF THE DRAWINGS

FIG. 7 is an enlarged diagram schematically illustrating brackets illustrated in FIG. 3 and the vicinity thereof.

DETAILED DESCRIPTION OF THE INVENTION

A portable information device and a cover device according to the present invention will be described in detail below with reference to the accompanying drawings by taking a preferred embodiment.

Figure 1:
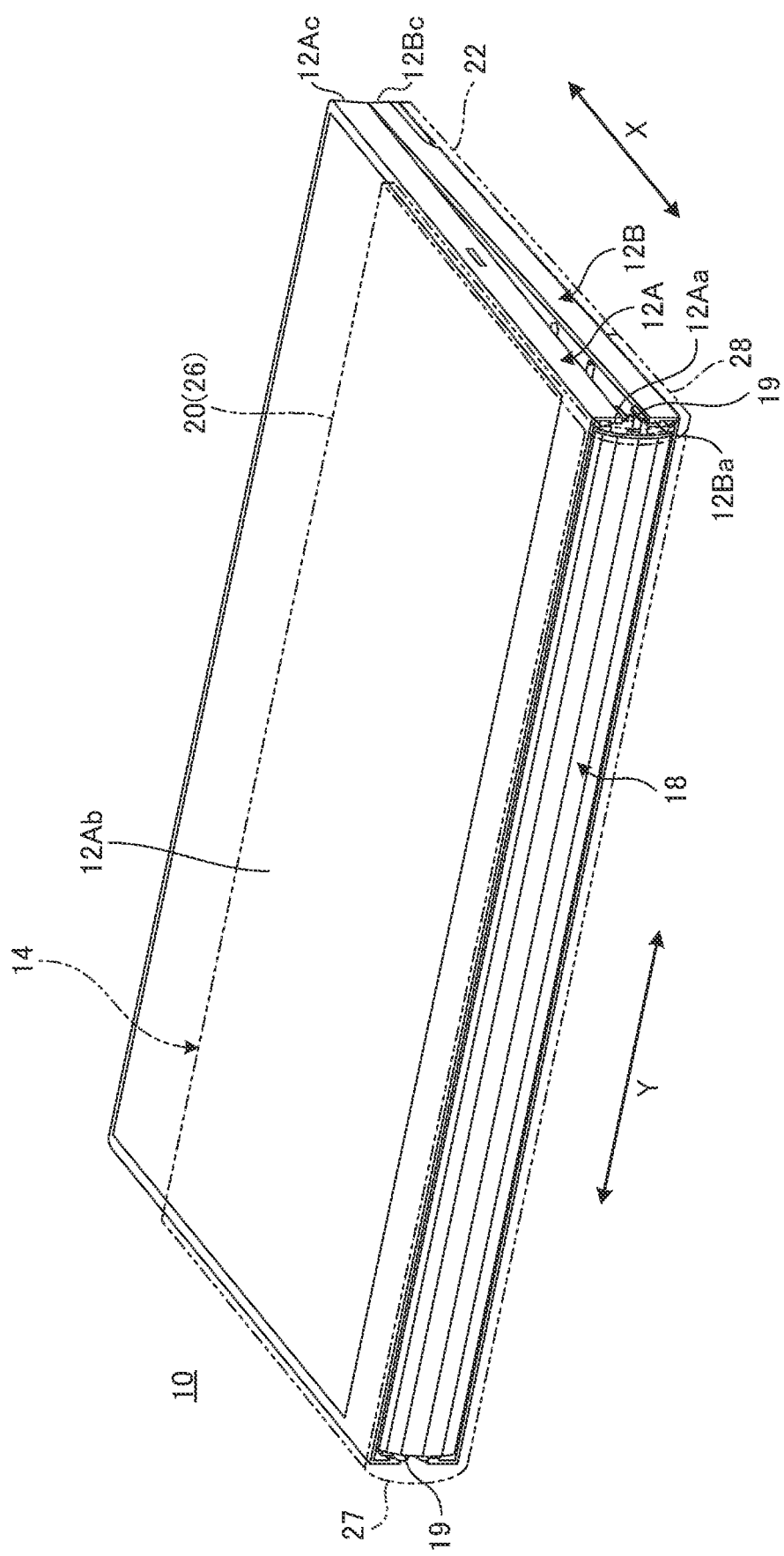
FIG. 1 is a perspective view illustrating a state where a portable information device according to one embodiment is closed and shaped into a folded form.
Figure 2A:
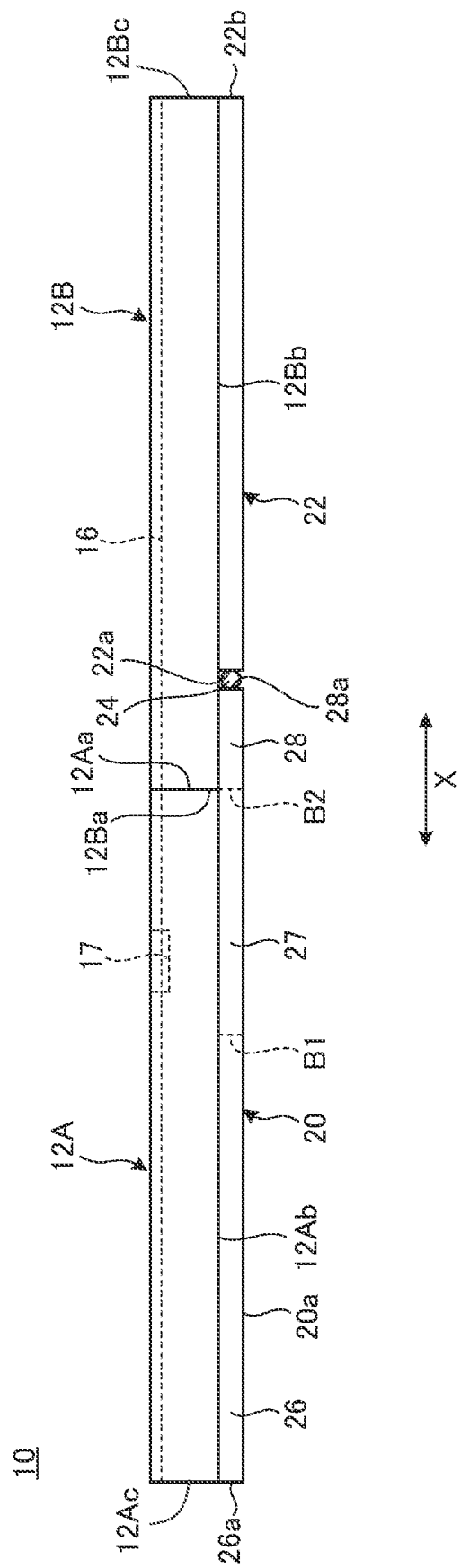
FIG. 2A is a side view schematically illustrating a state where the portable information device illustrated in FIG. 1 is opened and shaped into a flat plate form.
Figure 2B:
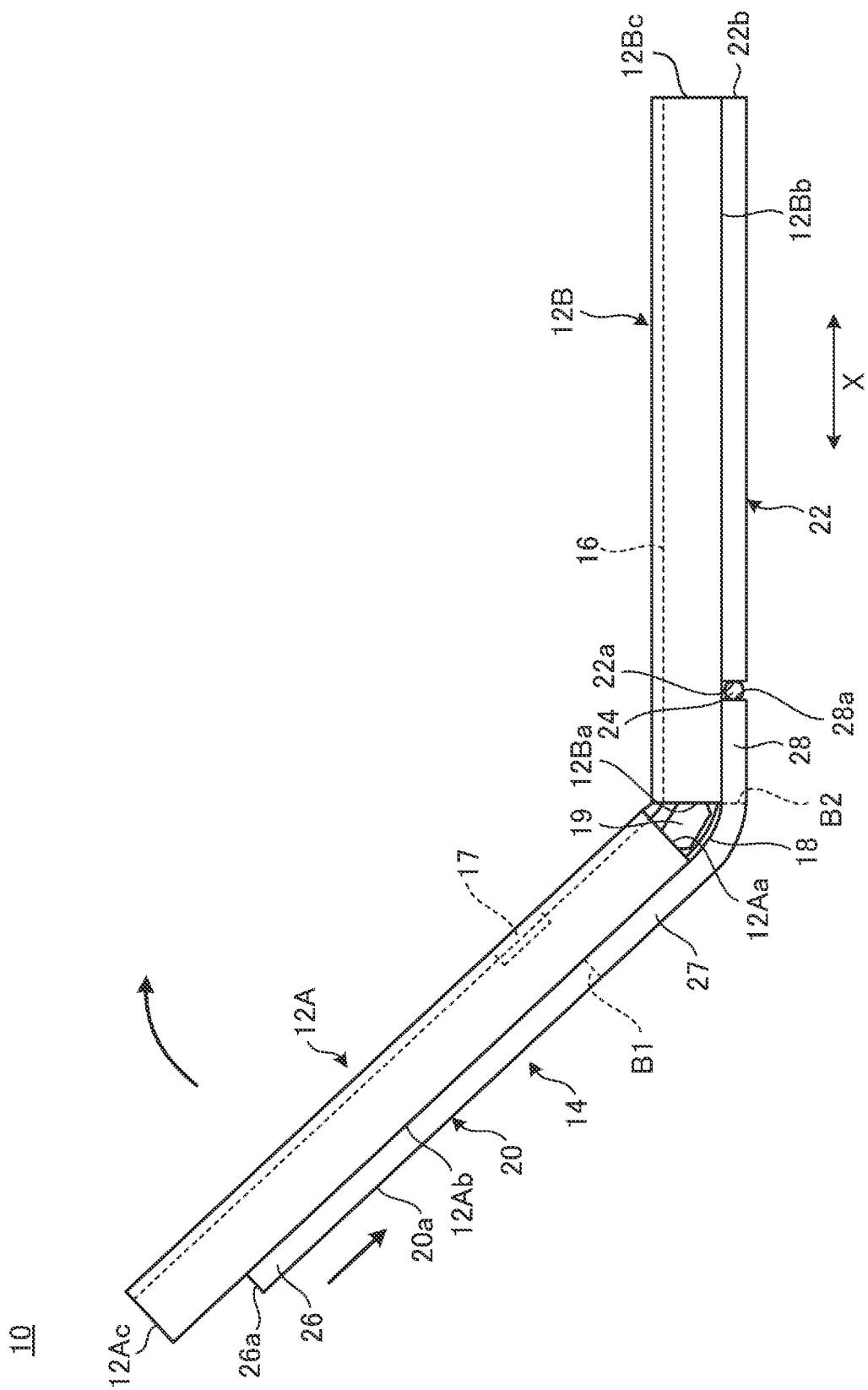
FIG. 2B is a side view in a state where the portable information device illustrated in FIG. 2A is shaped into a laptop form.
Figure 2C:
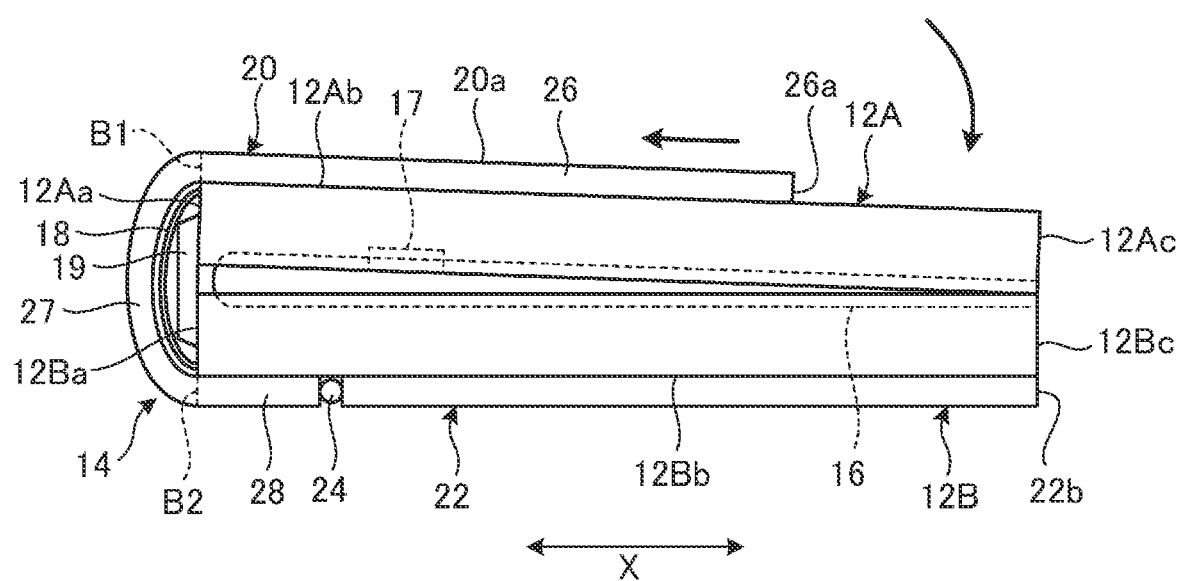
FIG. 2C is a side view in a state where the portable information device illustrated in FIG. 2B is closed and shaped into the folded form.

FIG. 1 is a perspective view illustrating a state where a portable information device 10 according to one embodiment is closed and shaped into a folded form. FIG. 2A is a side view schematically illustrating a state where the portable information device 10 illustrated in FIG. 1 is opened and shaped into a flat plate form. FIG. 2B is a side view in a state where the portable information device 10 illustrated in FIG. 2A is shaped into a laptop form. FIG. 2C is a side view in a state where the portable information device 10 illustrated in FIG. 2B is closed and shaped into the folded form.

As illustrated in FIG. 1 to 2C, the portable information device 10 includes a first chassis 12A, a second chassis 12B, and a cover device 14. The portable information device 10 of the embodiment is a foldable tablet PC or laptop PC. The cover device 14 has a protection function to cover the outer surfaces of the chassis 12A and 12B in order to protect the chassis 12A and 12B, and a decoration function to decorate the outer surfaces in order to enhance the appearance design. The portable information device on which the cover device 14 is mounted may also be a common clamshell laptop PC, a single plate-shaped tablet PC, a smartphone, a portable game machine, or the like, as well as the portable information device 10.

First, the structure of the portable information device 10 will be described. The portable information device 10 includes the chassis 12A, 12B and a display 16.

The chassis 12A and 12B are placed adjacent to each other. Adjacent edges 12Aa and 12Ba of the chassis 12A and 12B are covered internally with a spine member 18. Each of the chassis 12A and 12B is formed into a rectangular, plate-shaped member with side walls standing on three sides except the adjacent edge 12Aa, 12Ba, respectively. The chassis 12A, 12B is formed from a metal plate made of stainless steel, magnesium steel, aluminum steel, or the like, or formed from a fiber-reinforced plastic plate containing reinforcing fiber such as carbon fiber.

The portable information device 10 as illustrated in FIG. 1 to FIG. 2C will be described below by expressing a line-up direction of the chassis 12A, 12B as an X direction and a direction orthogonal to the line-up direction along the adjacent edges 12Aa, 12Ba as a Y direction.

The adjacent edges 12Aa and 12Ba of the chassis 12A and 12B are coupled to each other through a pair of hinges 19, 19. The chassis 12A and 12B are coupled by the hinges 19 to be rotatable relative to each other between the flat plate form illustrated in FIG. 2A and the folded form illustrated in FIG. 2C. The hinges 19 can generate a predetermined rotation torque. Therefore, the chassis 12A and 12B are stabilized even in the laptop form (see FIG. 2B) in which the angle between the chassis 12A and 12B is about 90° to 140°. For example, the hinges 19 are disposed in both end portions of the adjacent edges 12Aa and 12Ba of the chassis 12A and 12B in the Y direction, and located outside of an outer peripheral edge of the display 16, respectively. The portable information device 10 of the embodiment is so set that the rotation center between the chassis 12A and 12B by the hinges 19 matches the surface of the display 16.

Inside of the respective chassis 12A and 12B, various electronic components and the like, such as a motherboard, various semiconductor chips like a CPU mounted on the motherboard, a communication module, a battery device, and a cooling device, are mounted. Reference numeral 17 in FIG. 2A to FIG. 2C denotes an imaging camera to face from an opening formed in a bezel surrounding the display 16 on the surface of the first chassis 12A.

The display 16 is, for example, a touch panel liquid crystal display. A band-shaped range of the display 16 extending in the Y direction across the adjacent edges 12Aa and 12Ba is a folding region. Thus, the display 16 is foldable together when the chassis 12A and 12B are folded, and opened and closed along with the opening/closing operation of the chassis 12A and 12B. The display 16 is, for example, a flexible display such as organic EL (Electro Luminescence) having a highly flexible paper structure or the like.

Figure 3:
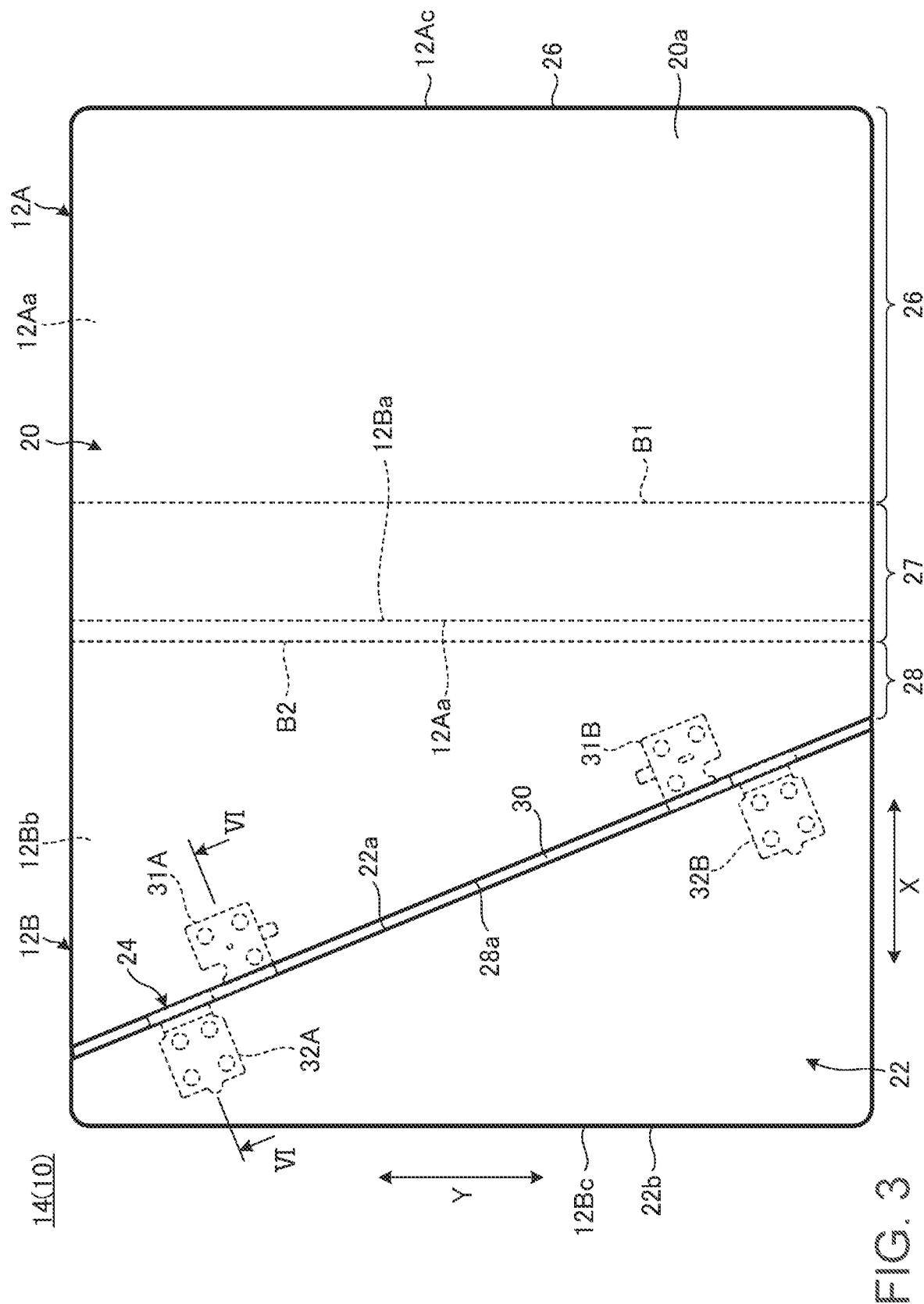
FIG. 3 is a plan view of the portable information device as viewed from the side of a cover device.

The overall structure of the cover device 14 will next be described. FIG. 3 is a plan view of the portable information device 10 as viewed from the side of the cover device 14.

As illustrated in FIG. 1 to FIG. 3, the cover device 14 is provided to cover the back surfaces 12Ab and 12Bb of the chassis 12A and 12B. In the flat plate form (see FIG. 2A), the cover device 14 covers the entire back surfaces 12Ab and 12Bb. In the laptop form and the folded form (see FIG. 2B and FIG. 2C), the cover device 14 covers most of the back surface 12Ab and the entire back surface 12Bb.

The cover device 14 includes a base cover section 20, a stand cover section 22, and a hinge device 24. The cover sections 20 and 22 extend in the X direction across the hinge device 24. In the flat plate form, the cover sections 20 and 22 cover the entire back surfaces 12Ab and 12Bb as a whole, that is, cover the chassis 12A and 12B from an open edge 12Ac of the first chassis 12A to an open edge 12Bc of the second chassis 12B. The open edges 12Ac and 12Bc are edges located on the other side of the adjacent edges 12Aa and 12Ba in the X direction to extend in the Y direction, respectively.

The base cover section 20 has a slide cover section 26, a folding cover section 27, and a fixed cover section 28 in this order from the side of the first chassis 12A toward the side of the second chassis 12B.

The slide cover section 26 is a thin plate-shaped member provided to be slidable in the X direction relative to the back surface 12Ab of the first chassis 12A. In the flat plate form illustrated in FIG. 2A and FIG. 3, a distal edge 26a of the slide cover section 26 matches the open edge 12Ac of the first chassis 12A. The distal edge 26a is located on the other side of a border line B1 with the folding cover section 27 in the X direction, which is an edge extending in the Y direction. In the laptop form and the folded form illustrated in FIG. 2B and FIG. 2C, the slide cover section 26 is slid to a position where the distal edge 26a is retreated from the open edge 12Ac to the side of the adjacent edge 12Aa, respectively. The slide structure of the slide cover section 26 with respect to the first chassis 12A is not particularly limited. For example, a slide mechanism is so constructed that a slide part fixed to the first chassis 12A is coupled to a rail fixed to the slide cover section to be slidable in the X direction.

The folding cover section 27 is provided in a position between the chassis 12A and 12B across the adjacent edges 12Aa and 12Ba, which is a band-shaped region narrow in the X direction and extending in the Y direction. The folding cover section 27 is connected to the slide cover section 26 to be foldable on the border line B1 along the Y direction on the side of the first chassis 12A. Then, the folding cover section 27 is connected to the fixed cover section 28 to be foldable on a border line B2 along the Y direction on the side of the second chassis 12B. The folding cover section 27 has flexibility as a whole to connect between the first cover section 26 and the fixed cover section 28 to be rotatable relative to each other. The folding cover section 27 is a flexible hinge to rotate the cover device 14 following the rotational operation between the chassis 12A and 12B. The folding cover section 27 is a folding region having a width dimension in the X direction to be able to cover the adjacent edges 12Aa and 12Ba of the chassis 12A and 12B at least in the folded form illustrated in FIG. 2C.

The fixed cover section 28 is a thin plate-shaped member to cover the back surface 12Bb of the second chassis 12B together with part of the folding cover section 27 and the stand cover section 22. The fixed cover section 28 is formed into a shape substantially line-symmetric with respect to the stand cover section 22, which is a substantially trapezoidal shape in plan view in the embodiment. The fixed cover section 28 is fixed relative to the back surface 12Bb of the second chassis 12B. The fixed cover section 28 of the embodiment is fixed directly to the back surface 12Bb. An edge 28a of the fixed cover section 28 on the other side of the border line B2 in the X direction is adjacent to the stand cover section 22 through the hinge device 24. The edge 28a is inclined in the X direction gradually toward the Y direction.

Figure 4:
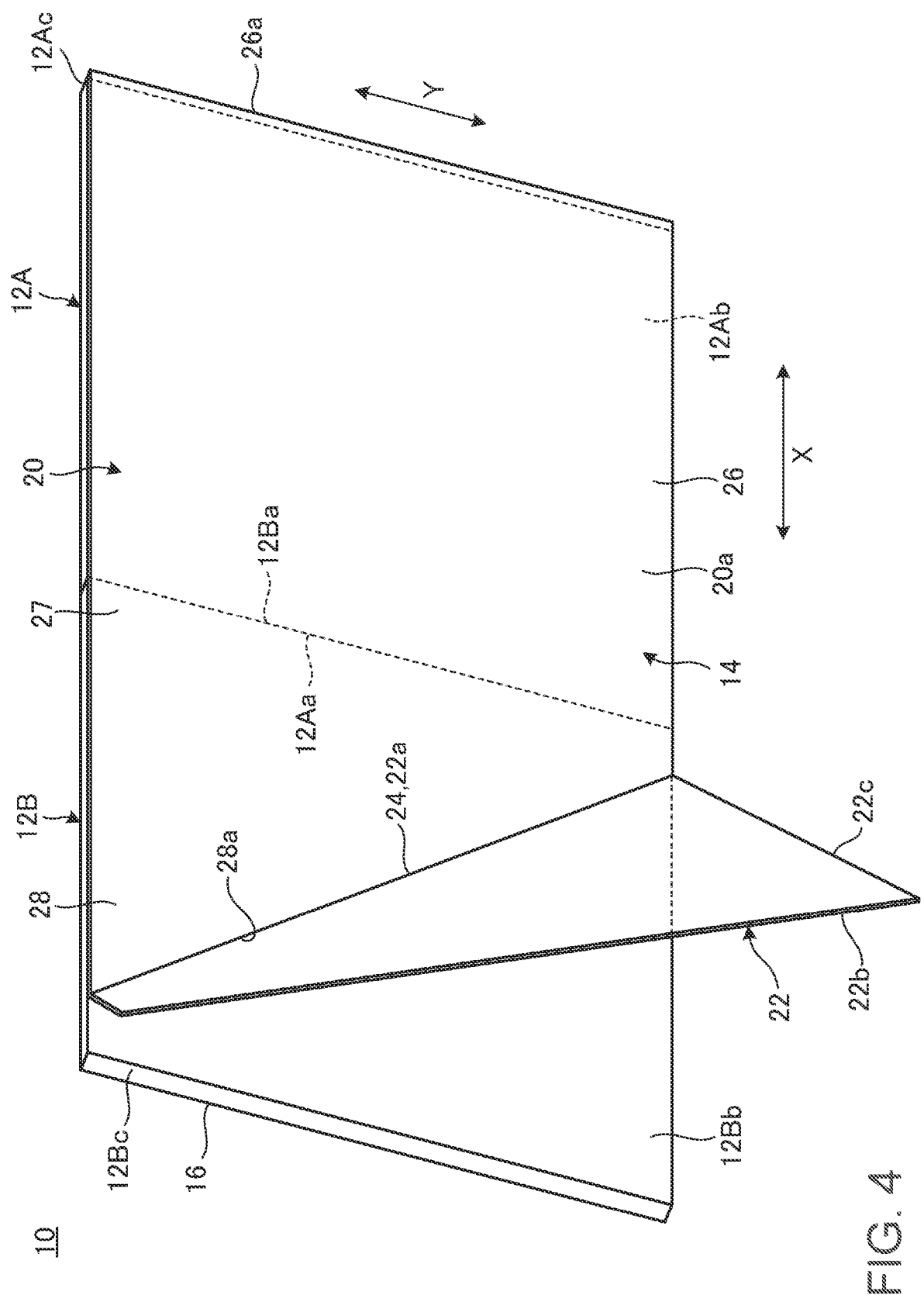
FIG. 4 is a schematic perspective view in a state where a stand cover section is set to a standing position to make the portable information device stand up.

FIG. 4 is a schematic perspective view in a state where the stand cover section 22 is set to a standing position to make the portable information device 10 stand up. As illustrated in FIG. 4, the stand cover section 22 is provided to be rotatable relative to the fixed cover section 28 of the base cover section 20 and the back surface 12Bb of the second chassis 12B. The stand cover section 22 of the embodiment is coupled to the back surface 12Bb of the second chassis 12B through the hinge device 24.

As illustrated in FIG. 2A to FIG. 4, the stand cover section 22 is formed into a shape substantially line-symmetric with respect to the fixed cover section 28, which is a substantially trapezoidal shape in plan view in the embodiment. The stand cover section 22 is so provided that an edge 22a adjacent to the edge 28a of the fixed cover section 28 across the hinge device 24 is coupled to the hinge device 24. A distal edge 22b of the stand cover section 22 on the other side of the edge 22a matches the open edge 12Bc of the second chassis 12B.

By rotational operation of the hinge device 24, the stand cover section 22 can move from a stored position (0°) where the distal edge 22b abuts against the back surface 12Bb in a direction away gradually from the back surface 12Bb. The distal edge 22b can move up to a position (180°) at which the distal edge 22b abuts against a surface 20a of the base cover section 20 and further movement is restricted. Thus, the stand cover section 22 can move between the stored position (see FIG. 2A and FIG. 3) where the stand cover section 22 is provided along the back surface 12Bb, and the standing position (for example, see FIG. 4) where the stand cover section 22 protrudes from the back surface 12Bb.

As illustrated in FIG. 4, the stand cover section 22 is set to a proper angle (standing position) with respect to the fixed cover section 28 to function as a stand to keep the portable information device 10 in the flat plate form in a standing posture. In the standing position of the stand cover section 22, a bottom edge 22c as a trapezoidal bottom abuts on a desk surface or the like so that the portable information device 10 can be kept in a predetermined standing posture fallen a little on the side of the back surfaces 12Ab and 12Bb.

Figure 5:
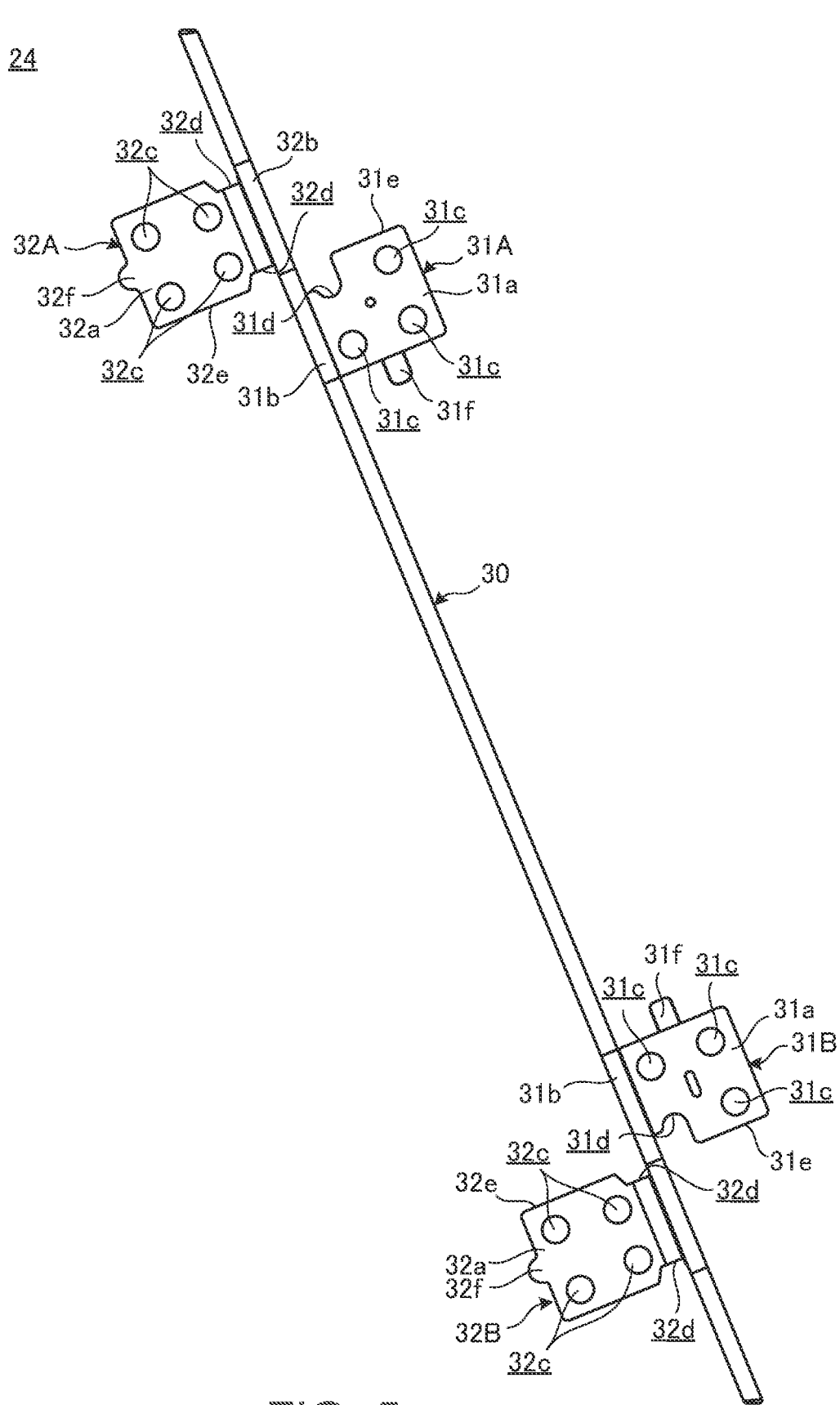
FIG. 5 is a schematic plan view of a hinge device.

FIG. 5 is a schematic plan view of the hinge device 24. The hinge device 24 couples the stand cover section 22 to be rotatable relative to the base cover section 20 and the second chassis 12B. As illustrated in FIG. 3 and FIG. 5, the hinge device 24 includes a hinge shaft 30, first brackets 31A and 31B, and second brackets 32A, 32B. In the hinge device 24 of the embodiment, a pair of the brackets 31A and 32A and a pair of the brackets 31B and 32B adjacent to each other are paired to constitute one hinge, respectively. Each pair of the first brackets and the second brackets may also be one pair, or three pairs or more.

The hinge shaft 30 is a metal rod-shaped member that intervenes between the edge 22a of the stand cover section 22 and the edge 28a of the fixed cover section 28 to extend along these edges 22a and 28a. The hinge shaft 30 is inclined in the XY directions along the edges 22a and 28a.

The first brackets 31A and 31B are mounting brackets for the second chassis 12B. Each of the first brackets 31A and 31B has a mounting plate 31a and a support cylinder 31b, respectively. The first brackets 31A and 31B may also be fixed to the base cover section 20. The first bracket 31A, 31B has the mounting plate 31a to be mounted on the second chassis 12B. The mounting plate 31a is coupled to the hinge shaft 30 through the support cylinder 31b.

The mounting plate 31a is a metal plate formed into a substantially rectangular shape. In the mounting plate 31a, three holes 31c and one notch-shaped portion 31d are provided to correspond to the four corners. Each of the holes 31c is a circular hole formed to penetrate through the mounting plate 31a in the plate thickness direction. The hole 31c is a fastening hole through which the first bracket 31A, 31B is fastened to the second chassis 12B with a screw 33 (see FIG. 6A).

The notch-shaped portion 31d is provided in a root part of the support cylinder 31b of the mounting plate 31a. The notch-shaped portion 31d of one first bracket 31A is formed on a side end face 31e to face the side of the second bracket 32A paired in the axial direction of the hinge shaft 30. The notch-shaped portion 31d of the other first bracket 31B is formed on a side end face 31e to face the side of the second bracket 32B paired in the axial direction of the hinge shaft 30. The notch-shaped portion 31d is so formed that the back thereof has a semicircle shape with the same diameter as the hole 31c. Thus, the notch-shaped portion 31d is also used as a fastening hole for the screw 33 like the hole 31c.

In the mounting plate 31a, a positioning piece 31f is also formed on the other side of the side end face 31e to protrude along the axial direction of the hinge shaft 30. The positioning piece 31f is a positioning portion of the hinge device 24 with respect to the base cover section 20 (the fixed cover section 28).

The support cylinder 31b is a mounting portion of the mounting plate 31a for the hinge shaft 30. The support cylinder 31b is externally fitted to the hinge shaft 30, and the mounting plate 31a protrudes from the outer circumferential surface of the support cylinder 31b.

The second brackets 32A and 32B are mounting brackets for the stand cover section 22. Each of the second brackets 32A and 32B has a mounting plate 32a for the stand cover section 22. The mounting plate 32a is coupled to the hinge shaft 30 through a support cylinder 32b.

The mounting plate 32a is a metal plate formed into a substantially rectangular shape. In the mounting plate 32a, four holes 32c are provided to correspond to the four corners. Each of the holes 32c is a circular hole formed to penetrate through the mounting plate 32a in the plate thickness direction. The hole 32c is a cutout hole for the purpose of weight reduction of the mounting plate 32a, which may be omitted.

Notch-shaped portions 32d are provided in a root part of a support cylinder 32b of the mounting plate 32a. In FIG. 5, it is illustrated such a structure that the notch-shaped portions 32d are provided in a root part of each of both side end faces of the mounting plates 32a, respectively. However, a notch-shaped portion 32d of one second bracket 32A has only to be formed on at least one side end face 32e that faces the side of the paired first bracket 31A. Similarly, a notch-shaped portion 32d of the other second bracket 32B has only to be formed on at least one side end face 32e that faces the side of the paired first bracket 31B. The notch-shaped portion 32d has a shape formed by notching the root part of the mounting plate 32a in a substantially trapezoidal shape. The notch-shaped portion 32d may also have a shape similar to the notch-shaped portion 31d. Conversely, the notch-shaped portion 31d may also have a shape similar to the notch-shaped portion 32d. In this case, four holes 31c may be provided in the mounting plate 31a.

The mounting plate 32a also has a positioning piece 32f formed on an end face on the other side of the support cylinder 32b to protrude in a direction orthogonal to the axial direction of the hinge shaft 30. The positioning piece 32f is a positioning portion of the hinge device 24 with respect to the stand cover section 2.

The support cylinder 32b is a mounting portion of the mounting plate 32a with respect to the hinge shaft 30. The support cylinder 32b is externally fitted to the hinge shaft 30 in such a manner that the mounting plate 32a protrudes from the outer circumferential surface of the support cylinder 32b.

In this hinge device 24, the support cylinders 31b of the pair of first brackets 31A and 31B are supported to be rotatable relative to the hinge shaft 30 with a predetermined rotational torque about the axis of the hinge shaft 30. Alternatively, the support cylinders 32b of the pair of second brackets 32A and 32B are supported to be rotatable relative to the hinge shaft 30 with a predetermined rotational torque about the axis of the hinge shaft 30. Thus, the hinge device 24 couples the stand cover section 22, to which the second brackets 32A and 32B are fixed, to the second chassis 12B and the base cover section 20, to which the first brackets 31A and 31B are relatively fixed, in such a manner that the stand cover section 22 is relatively rotatable with the predetermined rotational torque. As a result, the stand cover section 22 can keep the portable information device 10 in the standing position with a desired angle, thus functioning as a kickstand of the portable information device 10 (see FIG. 4).

Figure 6A:
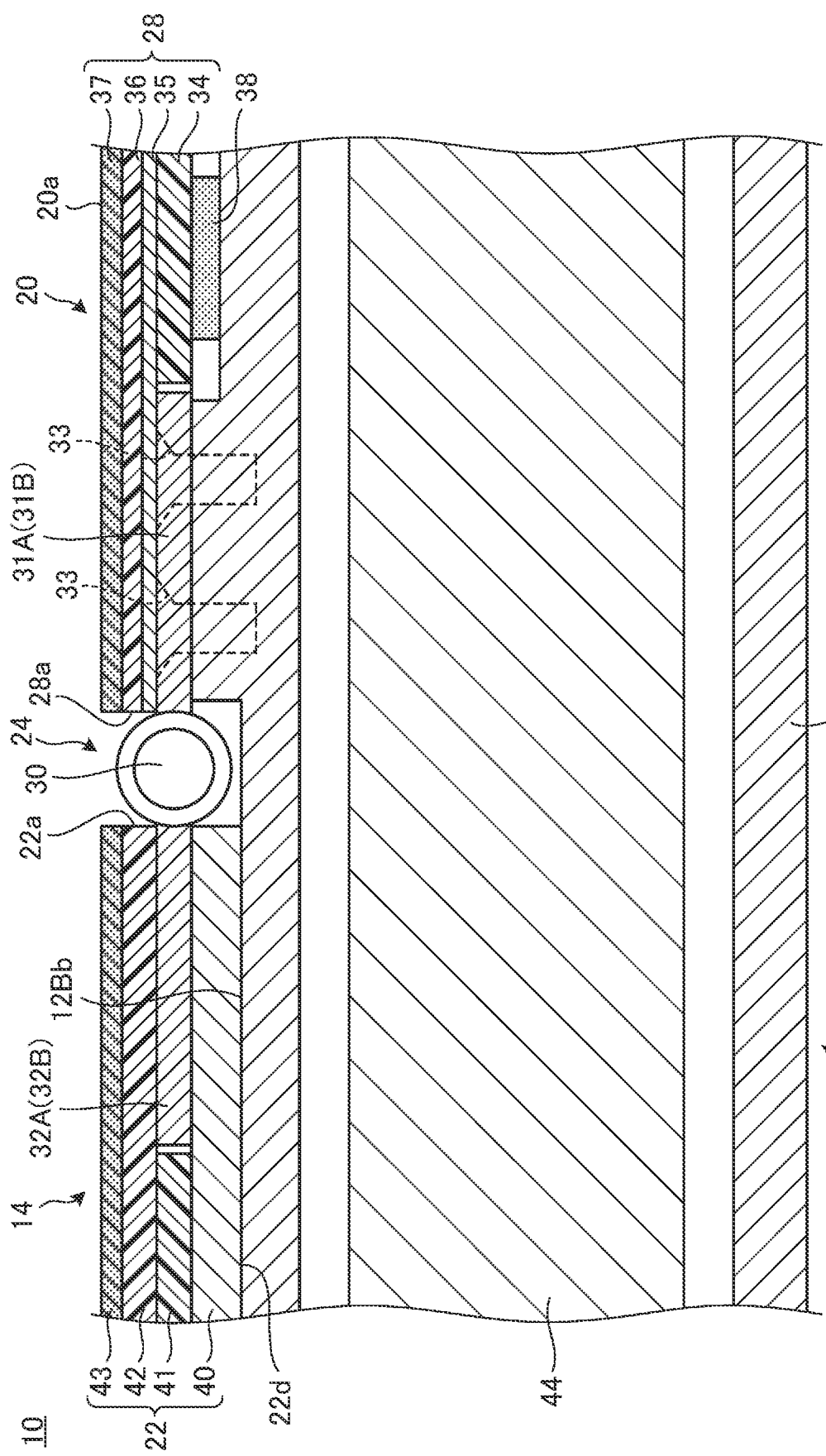
FIG. 6A is a schematical side sectional view of the portable information device and the cover device taken along line VI-VI in FIG. 3.
Figure 6B:
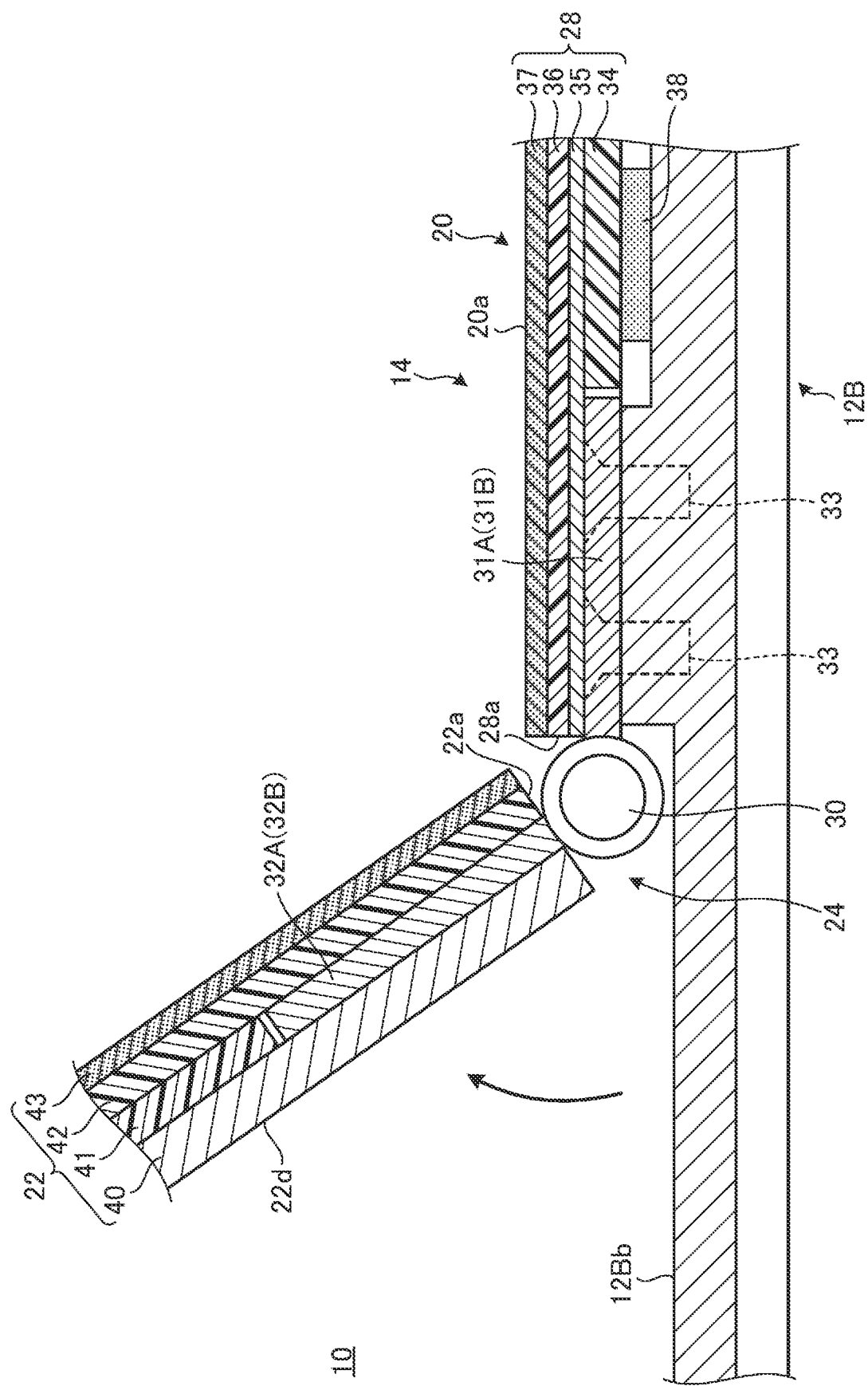
FIG. 6B is a side sectional view in a state where the stand cover section illustrated in FIG. 6A is set to the standing position.

Next, a specific internal structure of the cover device 14 will be described. FIG. 6A is a schematic side sectional view of the portable information device 10 and the cover device 14 taken along line VI-VI in FIG. 3. FIG. 6B is a side sectional view in a state where the stand cover section 22 illustrated in FIG. 6A is set to the standing position. Note that the line VI-VI in FIG. 3 means that right-side line VI on which the first bracket 31A is cut in the direction orthogonal to the axial direction of the hinge shaft 30 is prolonged along the axial direction of the hinge shaft 30 to form a straight line with left-side line VI on which the second bracket 32A is cut in the direction orthogonal to the axial direction of the hinge shaft 30.

As illustrated in FIG. 6A and FIG. 6B, the fixed cover section 28 in the base cover section 20 has a structure in which a core material 34, a graphite sheet 35, an auxiliary sheet 36, and a surface material 37 are laminated in this order from the side of the back surface 12Bb of the second chassis 12B.

The core material 34 is a hard member as the base of the fixed cover section 28. The core material 34 extends substantially over the entire surface of the fixed cover section 28, and notch holes and cutout holes are formed in various places of the core material 34 for weight saving or the like. The core material 34 is a plate-shaped member molded with a resin, such as glass fiber reinforced plastic (GFRP) formed by impregnating glass fiber with an epoxy resin or polycarbonate (PC). For example, the core material 34 has a plate thickness of about 1 to 2 mm. The core material 34 of the embodiment is fixed to the second chassis 12 by using a fixing member 38 such as double-sided tape or screws.

The graphite sheet 35 is fixed with double-sided tape or adhesive and laminated on the surface of the core material 34. The graphite sheet 35 extends substantially over the entire surface of the base cover section 20. For example, the graphite sheet 35 has a thickness of about 0.05 to 0.15 mm. The graphite sheet 35 is a heat diffusion sheet which absorbs and diffuses heat generated inside the portable information device 10. The graphite sheet 35 suppresses the formation of a local hot area (hot spot) on the surface 20a of the base cover section 20. The graphite sheet 35 may also be omitted.

The auxiliary sheet 36 is fixed with double-sided tape or adhesive and laminated on the surface of the graphite sheet 35. The auxiliary sheet 36 is provided to cover substantially the entire surface of the graphite sheet 35 in order to prevent an uneven shape such as a wrinkle of the graphite sheet 35 from being transferred to the surface material 37. The auxiliary sheet 36 is softer than the core material 34 and harder than the surface material 37. The auxiliary sheet 36 is a sheet-shaped member molded with a resin such as polycarbonate (PC). For example, the auxiliary sheet 36 has a thickness of about 0.1 to 0.5 mm. The auxiliary sheet 36 may also be omitted.

The surface material 37 is an external covering material to enhance the appearance design and the sense of touch of the base cover section 20. The surface material 37 is fixed with double-sided tape or adhesive and laminated on the surface of the auxiliary sheet 36. The surface material 37 covers the entire surface of the auxiliary sheet 36 to form the surface 20a of the base cover section 20. The surface material 37 is formed of artificial leather, natural leather, resin, or the like, which is a sheet-shaped member softer than the auxiliary sheet 36 and the core material 34. For example, the surface material 37 has a thickness of about 0.5 to 1 mm.

Although detailed description is omitted, the slide cover section 26 of the base cover section 20 is a laminated body having the same cross-sectional structure as the fixed cover section 28. The slide cover section 26 is so constructed that the rail of the slide mechanism mentioned above is fixed to the back surface of the core material 34. Unlike the fixed cover section 28 and the slide cover section 26, the folding cover section 27 does not have the core material 34 because of the need to have flexibility as a flexible hinge. In other words, the folding cover section 27 has a structure in which the graphite sheet 35, the auxiliary sheet 36, and the surface material 37 are laminated in this order from the side of the back surface 12Bb of the second chassis 12B. Note that it is better to laminate a sheet-shaped member like the auxiliary sheet 36 on the back surface of the graphite sheet 35, that is, between the graphite sheet 35 and the chassis 12A, 12B.

As illustrated in FIG. 6A and FIG. 6B, the stand cover section 22 has a structure in which a back material 40, a core material 41, an auxiliary sheet 42, and a surface material 43 are laminated in this order from the side of the back surface 12Bb of the second chassis 12B.

The back material 40 is an external covering material to enhance the appearance design and the sense of touch of a back surface 22d of the stand cover section 22 that appears outside in the standing position. The back material 40 is fixed with double-sided tape or adhesive and laminated on the back surface of the core material 41. The back material 40 is a soft sheet-shaped member formed of artificial leather, natural leather, resin, or the like. For example, the back material 40 has a thickness of about 0.5 to 1 mm.

Since the core material 41, the auxiliary sheet 42, and the surface material 43 can be the same as or similar to the core material 34, the auxiliary sheet 36, and the surface material 37 of the base cover section 20, the detailed description thereof will be omitted.

The laminated structures of the base cover section 20 and the stand cover section 22 mentioned above can be changed as appropriate, and the number of layers and the order of laminating the layers can also be changed as appropriate. Note that reference numeral 44 in FIG. 6A denotes the battery device installed inside the second chassis 12B.

As illustrated in FIG. 6A, the hinge device 24 of the embodiment is so structured that the whole of the hinge shaft 30 is located in a position lower than the surfaces of the surface materials 37 and 43 of the base cover section 20 and the stand cover section 22. Thus, since the hinge shaft 30, the bracket 31A, and the like do not protrude from the surface of the cover device 14 that forms the bottom of the second chassis 12B, a high appearance quality and a high sense of touch can be obtained. Note that the amount of protrusion of the hinge shaft 30 from the surface of the cover device 14 can be suppressed as long as at least the shaft center of the hinge shaft 30 of the hinge device 24 is located in a position lower than the surfaces of the surface materials 37 and 43 of the base cover section 20 and the stand cover section 22.

Figure 8:
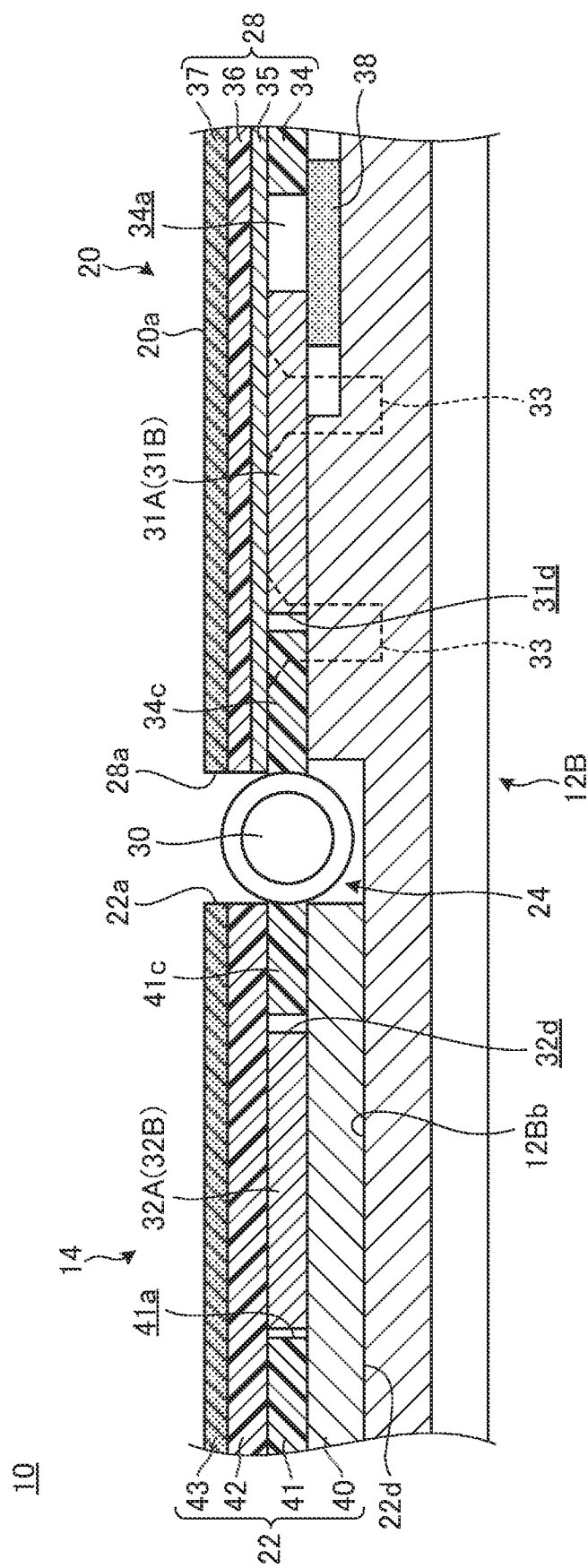
FIG. 8 is a schematic sectional view taken along line VIII-VIII in FIG. 7.

FIG. 7 is an enlarged diagram schematically illustrating the structure of the brackets 31A, 32A and the vicinity thereof illustrated in FIG. 3. FIG. 8 is a schematic sectional view taken along line VIII-VIII in FIG. 7. FIG. 7 illustrates a state where the surface materials 37, 43, the auxiliary sheets 36, 42, and the graphite sheet 35 are removed to expose the brackets 31A, 32A and the core materials 34, 41. Though not illustrated, the structure of the brackets 31B, 32B on the other side and the vicinity thereof is the same as the structure illustrated in FIG. 7 except that it is a structure symmetrical with respect to a plane orthogonal to the hinge shaft 30.

As illustrated in FIG. 7 and FIG. 8, the core material 34 of the fixed cover section 28 has a bracket placement hole 34a, a positioning recess 34b, and a protruding portion 34c.

The bracket placement hole 34a is a bay-shaped hole open to face the edge 28a, and the first bracket 31A (31B) is placed inside the bracket placement hole 34a. The bracket placement hole 34a has an inner peripheral shape slightly larger than the outer shape of the first bracket 31A (31B). The positioning recess 34b is provided in a notched shape to be dented from the inner peripheral surface of the bracket placement hole 34a. The positioning piece 31f is fitted into the positioning recess 34b to position the first bracket 31A (31B) with respect to the core material 34. The bracket placement hole 34a may also be a recessed hole, rather than the through hole.

The protruding portion 34c is a plate piece protruding from a portion of the inner peripheral surface of the bracket placement hole 34a to face the notch-shaped portion 31d of the first bracket 31A (31B) up to a position to get into the notch-shaped portion 31d. The protruding portion 34c extends to a position where the tip edge thereof gets into the notch-shaped portion 31d at least beyond the side end face 31e. Note that, since the notch-shaped portion 31d of the embodiment is also used as the fastening hole of the screw 33, the protruding portion 34c enters only up to a shallow position of the notch-shaped portion 31d. In a structure that does not consider fastening the screw 33, the protruding portion 34c may also be shaped to enter up to the back of the notch-shaped portion 31d.

As illustrated in FIG. 7 and FIG. 8, the core material 41 of the stand cover section 22 has a bracket placement hole 41a, a positioning recess 41b, and a protruding portion 41c.

The bracket placement hole 41a is a bay-shaped hole open to face the edge 22a, and the second bracket 32A (32B) is placed inside the bracket placement hole 41a. The bracket placement hole 41a has an inner peripheral shape slightly larger than the outer shape of the second bracket 32A (32B). The positioning recess 41b is provided in a notched shape to be dented from the inner peripheral surface of the bracket placement hole 41a. The positioning piece 32f is fitted into the positioning recess 41b to position the second bracket 32A (32B) with respect to the core material 34. The bracket placement hole 41a may also be a recessed hole, rather than the through hole.

The protruding portion 41c is a plate piece protruding from a portion of the inner peripheral surface of the bracket placement hole 41a to face the notch-shaped portion 32d of the second bracket 32A (32B) up to a position to get into the notch-shaped portion 32d. The protruding portion 41c extends to a position where the tip edge thereof gets into the notch-shaped portion 32d at least beyond the side end face 32e.

In this hinge device 24 of the cover device 14, there is a need to place the first bracket 31A (31B) and the second bracket 32A (32B) in a positional relationship in which both do not interfere with each other in the axial direction of the hinge shaft 30 but are as close as possible to each other. In other words, there is a need to place the brackets 31A (31B) and 32A (32B) in positions where the side end faces 31e and 32e of both brackets are located approximately on the same plane in the axial direction of the hinge shaft 30 or slightly separated from each other across this plane. This is because when the brackets 31A (31B) and 32A (32B) are separated in the axial direction, twists or rattles may occur between the brackets 31A (31B) and 32A (32B) during rotational operation to make the rotational operation of the stand cover section 22 and keeping the portable information device 10 in the standing position unstable. This is also because when the brackets 31A (31B) and 32A (32B) are separated, an expected rotational torque may not be able to be generated.

On the other hand, in this hinge device 24, there is also a case where the stand cover section 22 is rotated by more than 90 degrees with respect to the fixed cover section 28, that is, a case where the stand cover section 22 is tilted further to the right from the position illustrated in FIG. 6B. In this case, when the second bracket 32A (32B) gradually approaches the first bracket 31A (31B), the side end faces 31e and 32e of both brackets act like scissors blades. As a result, cutting power is generated between the side end faces 31e and 32e, and there is a concern that the surface materials 37 and 43 located therebetween might be broken down or damaged.

In this regard, in the cover device 14 of the embodiment, the first bracket 31A (31B) and the second bracket 32A (32B) paired to each other to make up the hinge have the notch-shaped portions 31d and 32d in the root parts of the side end faces 31e and 32e that face each other, respectively. This can suppress the breakage of the surface materials 37 and 43 between the side end faces 31e and 32e that approach each other like scissors blades even when the stand cover section 22 is rotated in the standing direction until the surface material 43 of the stand cover section 22 comes into contact with the surface material 37 of the fixed cover section 28. This is because the notch-shaped portions 31d and 32d are like portions of the scissors blades where root parts close to the axis of rotation are dented, and hence can reduce the cutting power generated between the side end faces 31e and 32e.

By providing the notch-shaped portions 31d and 32d in the root parts, the brackets 31A (31B) and 32A (32B) can suppress the surface materials 37 and 43 from being subjected to the cutting power. However, since the surface materials 37 and 43 are subjected to a pressing force by contacting each other and compressed in a manner to be pushed into the notch-shaped portions 31d and 32d, there is also a concern that the surface materials 37 and 43 might be damaged.

Therefore, in the cover device 14, the hard core materials 34 and 41 have the protruding portions 34c and 41c that get into the notch-shaped portions 31d and 32d, respectively, as illustrated in FIG. 7 and FIG. 8. Thus, even when the surface materials 37 and 43 are compressed with each other in the positions to be overlapped with the notch-shaped portions 31d and 32d, respectively, the back sides of the surface materials 37 and 43 are supported by the hard protruding portions 34c and 41c, respectively. Therefore, the surface materials 37 and 43 are prevented from being pushed into the notch-shaped portions 31d and 32d and broken down when being pressed against each other. If only the notch-shaped portions 31d and 32d are enough to get the effect of breakage prevention of the surface materials 37 and 43, the protruding portions 34c and 41c may be omitted.

In the hinge device 24 of the embodiment, at least the shaft center of the hinge shaft 30 is located in a position lower than the base cover section 20, the surface material 37 of the fixed cover section 28, and the surface material 43 of the stand cover section 22. In other words, the cover device 14 that virtually forms the bottom of the second chassis 12B can prevent the hinge shaft 30, the bracket 31A, and the like from protruding from the surface thereof. Therefore, in the laptop form illustrated in FIG. 2B, the bottom of the second chassis 12B as the main body side placed on a desk or the like is flattened to ensure high stability. Moreover, since the stand cover section 22 and the fixed cover section 28 are provided on the second chassis 12B as the main body side in the laptop form, the slide cover section 26 is never rubbed with the desk or the like when the laptop form is changed to the folded form or the flat plate form. Further, since the camera 17 is provided on the display side (on the side of the first chassis 12A) in the laptop form, like in the case of a common laptop PC, the camera 17 can be used smoothly.

Note that the present invention is not limited to the aforementioned embodiment, and changes can be made freely without departing from the scope of the present invention.

In the above, the foldable portable information device 10 is exemplified. However, when the portable information device is a tablet PC of a flat-plate type rather than of the folded type, the base cover section 20 of the cover device 14 may be formed by the fixed cover section 28 alone with the slide cover section 26 and the folding cover section 27 omitted.

In the above, since the stand cover section 22 is so constructed that the bottom edge 22c thereof matches the bottom end face of the second chassis 12B extending in the X direction, the hinge shaft 30 is placed in a posture to be inclined in the XY directions so that the portable information device 10 takes a standing posture fallen a little in the standing position illustrated in FIG. 4. However, the hinge shaft 30 may be installed in parallel with the X direction or the Y direction depending on the installation position of the stand cover section 22.

In the above, the structure in which the cover device 14 is fixed integrally to the chassis 12A and 12B is exemplified. However, the cover device 14 may be a single part as a body completely separated from the portable information device 10. In this case, the cover device 14 may be detachably attached to the chassis 12A and 12B, for example, by using magnets or hooks. In such a cover device 14, the first brackets 31A and 31B have only to be fixed to the core material 34 of the fixed cover section 28.

In the above, the portable information device 10 foldable in half like a book is exemplified. However, in addition to the structure in which the same shaped chassis are folded in half, various structures can be exemplified as foldable portable information devices, such as a double-door structure in which two small-sized chassis are coupled to the right and left edges of a large-sized chassis in a foldable manner, an S-shaped folding structure in which two chassis different in folding direction from each other are coupled to the right and left edges of one chassis, and a J-shaped folding structure in which a small-sized chassis is coupled to one of the right and left edges of a large-sized chassis in a foldable manner, and the number of coupled chassis may be four or more. In this case, the cover device 14 may have such a structure as to cover the whole or part of the back surface of each chassis, and two or more chassis may be used simultaneously.

The invention claimed is:

1. A portable information device comprising:
   a chassis; and
   a cover device that covers a back surface of the chassis, the cover device including:
      a base cover section along the back surface of the chassis;
      a stand cover section rotatable relative to the base cover section and thereby movable between a stored position where the stand cover section is along the back surface of the chassis and a standing position where the stand cover section protrudes from the back surface of the chassis; and
      a hinge device having a hinge shaft, a first bracket rotatably coupled to the hinge shaft and fixed to the back surface of the chassis, and a second bracket adjacent to the first bracket in an axial direction of the hinge shaft, coupled rotatably to the hinge shaft, and fixed to the stand cover section, wherein
   the first bracket has a first notch-shaped portion in a root part of a side end face thereof on a side of the hinge shaft to face a side of the second bracket in the axial direction, and
   the second bracket has a second notch-shaped portion in a root part of a side end face thereof on the side of the hinge shaft to face a side of the first bracket in the axial direction.

2. The portable information device according to claim 1, wherein
   the base cover section has a first core material, and a first surface material formed of a material softer than the first core material to form a surface of the base cover section,
   the stand cover section has a second core material, and a second surface material formed of a material softer than the second core material to form a surface of the stand cover section,
   the first core material has a first bracket placement hole in which the first bracket is disposed, and a first protruding portion protruding from an inner peripheral surface of the first bracket placement hole into the first notch-shaped portion, and
   the second core material has a second bracket placement hole in which the second bracket is disposed, and a second protruding portion protruding from an inner peripheral surface of the second bracket placement hole into the second notch-shaped portion.

3. The portable information device according to claim 1, wherein the hinge device is configured with at least a shaft center of the hinge shaft located in a position below surfaces of the base cover section and the stand cover section.

4. The portable information device according to claim 1, wherein
   the chassis includes:
      a first chassis; and
      a second chassis coupled to the first chassis to be rotatable relative to the first chassis,
   the base cover section includes:
      a slide cover section movable relative to a back surface of the first chassis along a line-up direction of the first chassis and the second chassis;
      a fixed cover section fixed to a back surface of the second chassis; and
      a folding cover section which connects between the slide cover section and the fixed cover section to be movable relative to each other, and
   the stand cover section is configured to be movable relative to the back surface of the second chassis and adjacent to the fixed cover section across the hinge device.

5. The portable information device according to claim 4, further comprising:
   a display on at least a surface of the first chassis; and
   a camera in a peripheral portion of the display on the surface of the first chassis.

6. A cover device configured to cover a back surface of a chassis of a portable information device, comprising:
   a base cover section;
   a stand cover section configured to be rotatable relative to the base cover section; and
   a hinge device having a hinge shaft, a first bracket rotatably coupled to the hinge shaft and fixed relative to the base cover section, and a second bracket adjacent to the first bracket in an axial direction of the hinge shaft, coupled rotatably to the hinge shaft, and fixed to the stand cover section, wherein
   the first bracket has a first notch-shaped portion in a root part of a side end face thereof on a side of the hinge shaft to face a side of the second bracket in the axial direction, and
   the second bracket has a second notch-shaped portion in a root part of a side end face thereof on the side of the hinge shaft to face a side of the first bracket in the axial direction.

7. The cover device according to claim 6, wherein
   the base cover section has a first core material, and a first surface material formed of a material softer than the first core material to form a surface of the base cover section,
   the stand cover section has a second core material, and a second surface material formed of a material softer than the second core material to form a surface of the stand cover section,
   the first core material has a first bracket placement hole in which the first bracket is disposed, and a first protruding portion protruding from an inner peripheral surface of the first bracket placement hole into the first notch-shaped portion, and
   the second core material has a second bracket placement hole in which the second bracket is disposed, and a second protruding portion protruding from an inner peripheral surface of the second bracket placement hole into the second notch-shaped portion.

8. The cover device according to claim 6, wherein the hinge device is configured with at least a shaft center of the hinge shaft located in a position below surfaces of the base cover section and the stand cover section.

* * * * *